United States Patent [19]

Knaus

[11] 3,779,420

[45] Dec. 18, 1973

[54] FLUID CONTAINER

[75] Inventor: Ernest Knaus, Akron, Ohio

[73] Assignee: The Goodyear Tire & Rubber Company, Akron, Ohio

[22] Filed: Aug. 13, 1971

[21] Appl. No.: 171,676

[52] U.S. Cl. .................. 220/63 R, 150/1, 220/85 B
[51] Int. Cl. ....................... B65d 25/16, B65d 89/02
[58] Field of Search ..................... 220/63 R, 85 B, ; 150/0.5, 1

[56] References Cited
UNITED STATES PATENTS

| | | | |
|---|---|---|---|
| 3,204,760 | 9/1965 | Whitefold | 150/1 |
| 3,233,411 | 2/1966 | Schubert | 220/85 B |
| 3,330,439 | 7/1967 | Moorman | 220/63 R |

FOREIGN PATENTS OR APPLICATIONS

| | | | |
|---|---|---|---|
| 502,860 | 5/1954 | Canada | 150/1 |
| 1,215,712 | 10/1959 | France | 150/0.5 |

*Primary Examiner*—George E. Lowrance
*Attorney*—F. W. Brunner et al.

[57] ABSTRACT

A flexible fuel container having an outwardly projecting pinch seam around the peripheral outermost edges thereof. The seam is capable of extending or expanding in a direction normal to the direction of the projecting seam in order to provide increased fluid-holding capacity in the container. The flexible containers are particularly useful as vacuum-formed fuel containers which are disposed within vehicle fuel tanks.

10 Claims, 5 Drawing Figures

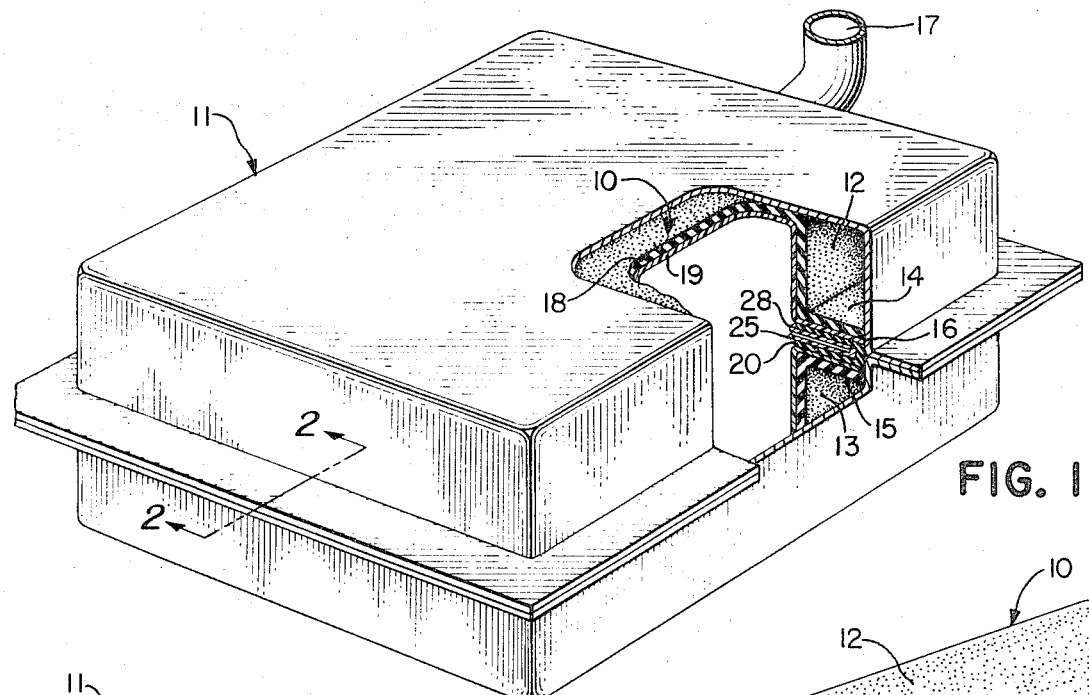
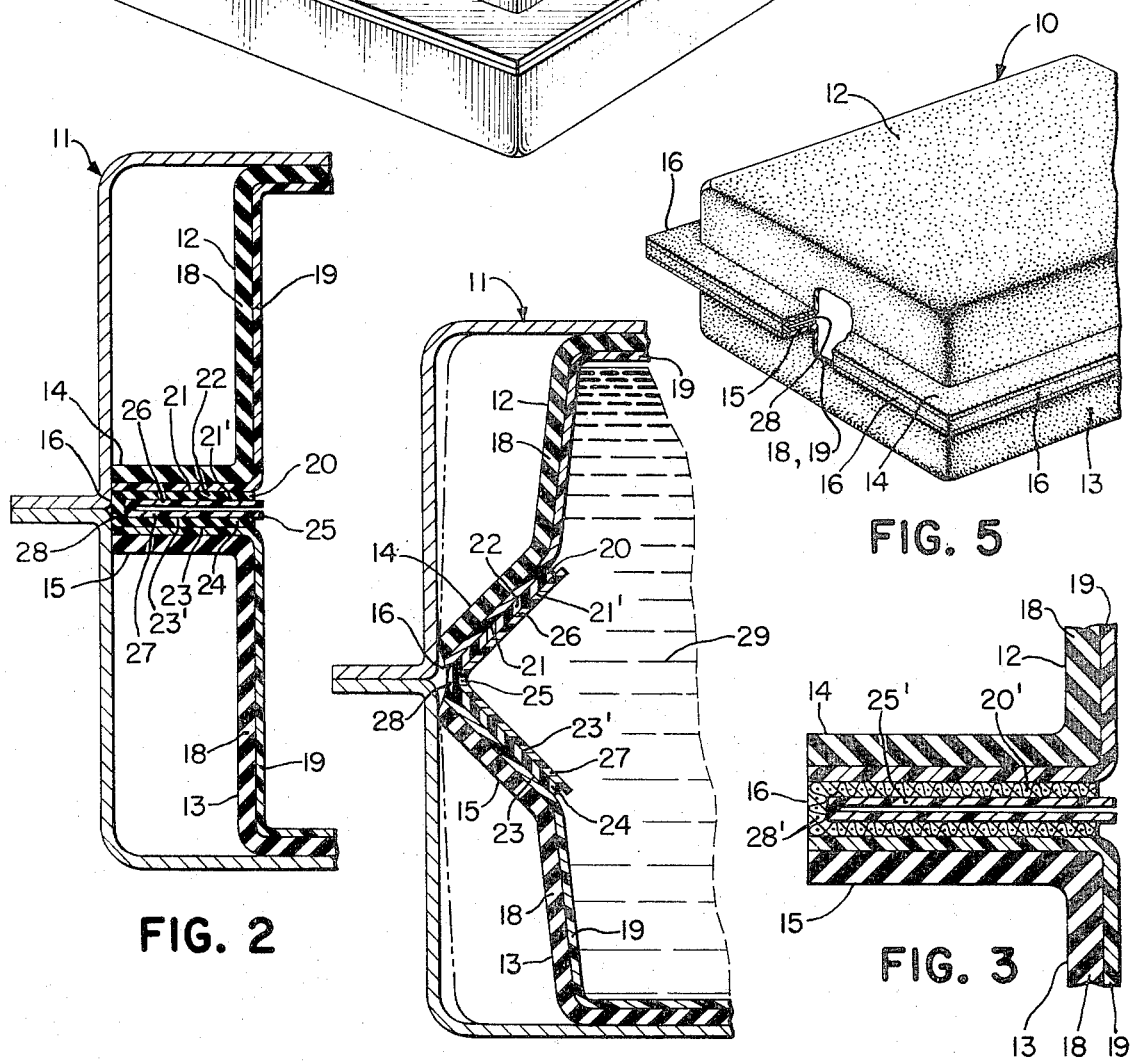

FLUID CONTAINER

This invention relates to flexible fluid containers and more specifically to such containers having increased fluid-holding capacity. This invention has particular application to a vacuum formed fuel container of the type which is disposed within a rigid supporting structure such as a vehicle fuel tank.

It is well known that rigid fuel tanks tend to rupture upon impact, thus presenting a constant safety hazard to occupants of air and motor vehicles in which they are used. Flexible fuel containers or fuel cells, when properly designed, inherently have less tendency to rupture dictating their increased use.

Accordingly, flexible fuel cells constructed of liquid impervious polymeric or elastomeric material such as nitrile rubber and polyurethane rubber and sometimes containing textile fabric and fuel barrier films are widely used in certain commercial and military applications. These flexible fuel containers also show promise in automotive vehicle applications. For instance, due to this inherent superiority, it is now a compulsory safety requirement that most racing vehicles be equipped with flexible or non-rigid fuel cells.

Flexible fuel containers are normally installed inside a rigid supporting structure having a cavity therein which provides support and maintains the shape of the cell during normal operation. This cavity is commonly formed by a metal or plastic tank which completely encloses the cell or by an integral portion of the structure and body of the vehicle which is specially shaped to provide an area into which the flexible fuel cell is disposed.

A relatively recent development in flexible fuel container production is to provide a container prepared by vacuum shaping curable flexible sheets and bonding them together at their seam. The procedure for forming these containers is described in US application Ser. No. 717,581 filed Apr. 1, 1968, now abondoned and continued as US application Ser. No. 41,072 filed May 27, 1970 now abandoned and continued as US application Ser. No. 191,129 filed Oct. 20, 1971. It has been found that a container formed in this manner provides a safer, more economical automotive fuel tank construction than the previous all metal fuel tanks. However, some difficulties have been encountered with the use of the exterior vacuum-formed containers because of the exterior pinch seam formed around the periphery of the container. For instance, this outwardly projecting peripheral seam being relatively rigid tends to result in the decreased volumetric capacity of the container when it is disposed within a rigid supporting structure due to the resulting distortion of the container caused by the seam pressing against the inner surface of the structure. In this regard, tests have shown that an automotive fuel tank having a normal capacity of 18 gallons may be reduced to a capacity of as little as 16½ gallons because of the decreased volumetric capacity caused by the pinch seam construction.

Therefore, it is an object of the present invention to provide a pinch seam container having increased fluid-holding capacity.

It is a further object of this invention to provide a vacuum-formed pinch seam fuel container for an automotive vehicle having full volumetric capacity for the fuel contained therein.

Other objects and advantages of this invention will become apparent hereinafter as the description thereof proceeds, the novel features, arrangements and combinations being clearly pointed out in the specification as well as the claims thereunto appended.

In accordance with this invention, it has been found that the beforementioned objects are accomplished by providing a flexible fluid container formed of two spaced opposed sheets of flexible material having their peripheral outermost edges joined to form a chamber therebetween with an outwardly projecting seam therearound with the container including means communicating with the chamber to allow the container to be filled with a fluid and means associated with the seam to allow extension in a direction normal to the direction of the projecting seam thereof when the container is filled in order to provide increased fluid-holding capacity in the container.

The seam extension means may be a continuous strip of fabric or elastomeric material having a surface of one section thereof contacting the inner surface of one sheet in the seam structure and a surface of another section thereof opposed to the first section contacting the inner surface of the other sheet in the seam structure thereby conforming to the contour of the seam, and means for preventing adhesion between the sections of said strip so that when the container is filled, the seam can freely extend or expand. The adhesion preventing means may be a second strip of material dissimilar to that of the first mentioned strip which is inserted between sections of the first mentioned strip to prevent adhesion therebetween. The second strip is preferably bonded to the inner surface of the first strip to form a composite structure in the form of one continuous laminated strip.

In the preferred embodiment of the invention, a flexible fuel container is provided with a chamber therein defined by two opposed sheets of flexible polymeric material which have been joined together along their respective peripheral outer edges to form a seam therearound having a crotch-like contour. The container comprises means communicating with the chamber to allow the container to be filled, a first generally V-shaped composite strip of flexible material extending substantially around the entire interior periphery of the container and fitting into the crotch-like contour formed by the sheets adjacent the joined outer edges thereof with the strip including a first layer having a first section which contacts the inner surface of one of the sheets and a second section thereof which contacts the inner surface of the other sheet, and a second layer of dissimilar material to that of the first layer which is bonded to the first layer and disposed between the first and second sections of the first layer to prevent the adhesion thereof so that when the container is filled, the seam is free to extend or expand and thereby increase the capacity of the chamber.

The objects and advantages of the invention will become more apparent with reference to the drawings in which:

FIG. 1 is a perspective view of the invention with parts broken away to show the flexible fuel container in its normal position within the rigid supporting structure;

FIG. 2 is an enlarged sectional view taken on line 2—2 of FIG. 1 showing the seam structure of the invention when the container is in an empty condition;

FIG. 3 is a modification of the invention shown in FIG. 2;

FIG. 4 is an enlarged sectional view of the invention shown in FIG. 2 illustrating the seam structure in its expanded or extended condition when the container is filled with fluid; and FIG. 5 shows a perspective view of the flexible container of this invention subsequent to the vacuum forming procedure with parts broken away to more clearly show the invention.

In the drawings, FIGS. 1 and 2 show the flexible fluid container 10 of this invention in an empty condition as installed in its normal operating position within a rigid supporting structure which in this case is formed by a vehicle fuel tank 11 completely enclosing the container 10. The tank 11 is a typical metal fuel tank constructed of sheet metal sections having a wall thickness of about 0.024 of an inch which have been joined together by welding or by means of bolts or rivets. It is to be understood that the rigid supporting structure may also take the form of a cavity in the vehicle structure which is specifically shaped to provide an area into which the flexible container is disposed.

The flexible container 10 is formed of two spaced opposed sheets 12 and 13 of flexible material and preferably a flexible curable polymeric material such as natural rubber and the various synthetic rubbers. The container 10 is formed into a composite structure by the process of vacuum forming or shaping in which the sheets 12 and 13 have been joined together along their outermost edges 14 and 15 respectively to form a chamber therebetween with an outwardly projecting seam 16 around the periphery thereof. Means such as an inlet 17 is also provided which communicates with the chamber to allow the container 10 to be filled.

When the container 10 is disposed within the supporting structure of the tank 11, the seam 16 presses against the inner surface of the tank 11. In conventionally constructed containers of this type, this contact between the relatively rigid seam 16 and the inner surface of the tank 11 causes a distortion of the sidewalls of the container 10 resulting in a decrease of the volumetric capacity of the container 10 thereby reducing the quantity of fluid or liquid fuel it may contain. However, the containers 10 of this invention are constructed in a manner so that the seam 16 is capable of expanding or extending when the chamber is being filled with a liquid material through the inlet 17 to thereby increase the volumetric capacity of the container 10 as will be hereinafter fully described.

The seam construction 16 of the container 10 is best seen in FIGS. 2, 3 and 4. The flexible sheets 12 and 13 are of a laminated construction which preferably includes a curable polymeric layer 18 having at least one layer 19 of a hydrocarbon barrier material adhered thereto by means of a suitable adhesive well known for that purpose. The polymeric layer 18 is preferably composed of polybutadiene acrylonitrile rubber having a thickness range of from about 0.020 of an inch to about 0.120 of an inch. Other liquid impervious polymeric or elastomeric materials can also be used for this purpose. The barrier layer 19 has a thickness range of about 0.005 of an inch to 0.001 of an inch and is preferably composed of a nylon film but may also be formed from other well-known materials for this purpose such as polyester or polyvinylindene chloride.

A continuous strip 20 of flexible material, preferably an unvulcanized polymeric or elastomeric material, is provided between the outermost edges 14 and 15 of the sheets 12 and 13 respectively having a surface 21 of one section 22 thereof contacting the inner surface of the layer 19 of outermost edge 14 of sheet 12 and a surface 23 of another section 24 thereof opposed to the section 22 contacting the inner surface of the layer 19 of outermost edge 15 of sheet 13 in the seam structure thereby conforming to the contour of the seam 16. For this purpose, the strip 20 is preferably folded back on itself to form a closed V and has a thickness of from about 0.030 of an inch to about 0.060 of an inch.

Means for preventing the adhesion of the strip sections 22 and 24 is also provided preferably in the form of a strip 25 of material dissimilar to that of strip 20 disposed between the sections 22 and 24. This may be, for example, a strip of nylon film or other thermoplastic material the same or similar in composition and thickness as the previously described barrier layer 19. The strip 25 serves to prevent the adhesion between the sections 22 and 24 of the strip 20. In order to accomplish this result the strip 25 includes a portion 26 which is adhered to the surface 21' of the section 22 of the strip 20 and a portion 27 which is adhered to the surface 23' of the strip 20. The adhesion may be effected by methods and materials well known in the art.

Although the strip 25 may be a completely separate component it is preferably bonded or adhered to the inner surfaces 21' and 23' of the strip 20 by means of a suitable adhesive to form a composite laminated strip 28 prior to vulcanization of the fuel container 10. This composite strip 28 therefore most desirably includes a layer 20 of elastomeric material and a layer 25 of thermoplastic material. The nylon or thermoplastic layer 25 should extend slightly beyond the edges of the elastomeric layer 20 in order to prevent the extreme edges of the layer 20 from adhering together. It should be appreciated in this construction that the composite strip 28 including the layers 20 and 25 acts as a seal in the seam structure.

As shown in FIG. 3, the continuous strip 20' may also be constructed of a textile fabric material such as tire cord fabric or a fabric-reinforced elastomeric material to which is bonded a nylon layer 25'. Any of the conventional textile fabric materials may be used for this purpose such as cotton, nylon, rayon or polyester or combinations thereof. Of course, other materials such as steel or fiber glass may also be used if desired. The layers 20' and 25' may also be joined into a composite structure in the form of a laminated strip 28'.

The operation of the seam structure is shown with reference to FIG. 4. When a fluid or liquid 29 such as a hydrocarbon fuel is introduced through the inlet 17 into the chamber of the container 10, the seam structure is free to extend in a direction normal to the direction of the protruding seam 16 in order to provide increased fluid-holding capacity by allowing the expansion of the container 10.

The prefered method of constructing the flexible fuel container 10 of this invention is as follows. The flexible sheet 13 made up of the polymeric layer 18 and the hydrocarbon barrier layer 19 adhered to the outer surface thereof is clamped on a first concave mold half around the periphery of the cavity therein. Suitable venting means are provided. A reduced pressure or vacuum is then applied between the mold cavity and sheet 13 which draws the flexible sheet 13 inwardly to the surface of the first mold half to conform the sheet 13 to the concave configuration of the mold cavity. A vent tube is injected through the first mold surface actually puncturing the sheet 13 and is preferably positioned with a sealant around the vent so that any reduced pressure between the first mold surface and the sheet is not substantially affected thereby. A coating of an adhesive or curable cement such as a rubber, epoxy or phenolic type of bonding cement is then applied around the inner surface or barrier layer 19 of the periphery of the outermost edges 15 of the sheet 13.

The composite strip 28 is prelaminated by having the portions 26 and 27 of the nylon thermoplastic layer 25 adhered to the inner surfaces 21' and 23' respectively of the unvulcanized elastomeric layer 20 by means of a suitable adhesive as described above. The strip 28 is formed into a V-shape having sections 22 and 24 with the surface 23 of the section 24 being adhered to the outer surface of the layer 19 of the outermost edge 15 of sheet 13.

The flexible sheet 12 including the polymeric layer 18 and thermoplastic layer 19 is next adhered along its outermost peripheral edge 14 to the strip 28 with the inner surface of barrier layer 19 contacting the surface 21 of the section 22 thereby defining a cavity between the sheets 12 and 13 with the barrier layers 19 of each sheet facing each other.

If the strip or layer 20 is composed of vulcanized elastomeric material or textile fabric material it is preferred that a coat of adhesive or cement be applied to the surface 23 or 24 to promote adhesion to the sheets 13 or 12 respectively.

After the sheets 12 and 13 have been thus joined along their peripheral or outermost edges 14 and 15, a second concave mold half also fitted with venting means is then clamped to the sheet 12 to form an enclosed cavity therebetween. A reduced pressure or vacuum is applied to the cavity thus formed to draw the sheet 12 to the surface of the second mold half to conform the sheet 12 to the concave configuration of the mold cavity. The vent tube previously described provides an air source to allow air to enter the cavity between the sheets 12 and 13, thereby assisting in conforming the sheet 12 to the mold contour and maintaining the sheet under pressure against the second mold surface.

In this position, the mold is placed in a suitable vulcanizing or curing apparatus such as a forced air oven and the flexible sheets, composite strip and curable cement are vulcanized following which the mold is removed from the oven and the prepared container 10 as shown in FIG. 5 is removed from the mold in the form of a composite structure.

It is to be understood that various other vacuum forming or shaping procedures may also be used to construct the flexible fluid containers of this invention.

The completed container 10 after vulcanization is provided with an extendable or expandable pinch seam structure with the composite strip 28 serving as a seal for the outermost edges 14 and 15 of the seam 16. As illustrated in FIGS. 1 through 4 when the flexible container is disposed within a supporting structure such as a vehicle fuel tank 11, the seam structure extends in a direction normal to the projecting seam 16 upon the introduction of a liquid through the inlet 17 into the interior of the container 10. This permits the container walls to expand to their full extent, thus increasing the volumetric capacity of the container 10.

The container 10 of this invention may be used to hold fluids and liquids of all types and are particularly suitable as containers for various liquid hydrocarbons and their mixtures exemplary of which are petroleum and coal tar distillates and various fuels such as gasoline and kerosene and various lubricating and fuel oils having boiling points at atmospheric pressure ranging from about −10°C to about 400°C and usually from about 0°C to about 150°C.

It should be obvious to those skilled in the art that the present invention provides a pinch seam container having increased fluid-holding capacity and more specifically provides a vacuum-formed pinch seam fuel container for an automotive vehicle having full volumetric capacity for the fuel contained therein.

While certain representative embodiments and details have been shown for the purpose of illustrating the invention, it will be apparent to those skilled in the art that various changes and modifications may be made therein without departing from the spirit or scope of the invention.

I claim:

1. A flexible fluid container formed of two spaced opposed sheets of flexible material having at least a portion of their peripheral outermost edges joined to form a chamber therebetween with an outwardly projecting seam therearound, said container including seam-extension means associated with said seam to allow extension in a direction normal to the direction of the projecting seam thereof when the chamber is filled in order to provide increased fluid-holding capacity in said container, said seam-extension means comprising a continuous strip of flexible material having a surface of one section thereof contacting the inner surface of one sheet in the seam structure and a surface of another section thereof opposed to said first section contacting the inner surface of the other sheet in the seam structure, thereby conforming to the contour of the seam, said strip having unjoined marginal edges projecting inwardly of the chamber, and means for preventing adhesion between the sections of said strip so that when the chamber is filled said seam can freely extend without presenting an undue obstruction within the chamber.

2. The container as claimed in claim 1 wherein said adhesion preventing means is a second strip of flexible material dissimilar to that of said first mentioned strip which is disposed between said sections thereof and prevents adhesion therebetween.

3. The container as claimed in claim 2 wherein said second strip is bonded to the inner surfaces of said first strip to form a composite structure in the form of one continuous laminated strip.

4. A flexible fuel container with a chamber therein defined by two opposed sheets of flexible polymeric material which have been joined together along their respective peripheral outer edges to form a seam therearound having a crotch-like contour, said container comprising:

A. means communicating with the chamber to allow the container to be filled;

B. a generally V-shaped composite strip of flexible material extending substantially around the entire interior periphery of the container and fitting into the crotch-like contour formed by said sheets adjacent said joined outer edges thereof with said strip including:
1. a first layer having a first section which contacts the inner surface of one said sheet and a second section thereof which contacts the inner surface of the other said sheet; and
2. a second layer of dissimilar material to that of said first layer which is bonded to said first layer and disposed between said first and second sections of said first layer to prevent the adhesion thereof so that when the container is filled the seam is free to extend and thereby increase the capacity of the chamber.

5. The container as claimed in claim 4 wherein said sheets are laminates composed of an outer layer of elastomeric material and an inner layer of liquid impervious material.

6. The container as claimed in claim 4 wherein said first strip layer is composed of elastomeric material and said second strip layer is composed of thermoplastic material.

7. The container as claimed in claim 6 wherein said first strip layer is composed of textile fabric material.

8. In a vacuum-formed flexible fuel container with a chamber therein, the combination of two opposed sheets of flexible fuel-resistant material which have been joined together along at least a portion of their respective peripheral outermost edges to form a seam therearound, means communicating with the chamber to allow the container to be filled with fuel, and the improvement comprising seam-extension means associated with said seam to allow extension thereof when the container is filled, thereby allowing the container to expand, said seam-extension means comprising a continuous strip of flexible material having a surface of one section thereof contacting the inner surface of one sheet in the seam structure and a surface of another section thereof opposed to said first section contacting the inner surface of the other sheet in the seam structure, thereby conforming to the contour of the seam, said strip having unjoined marginal edges projecting inwardly of the chamber, and means for preventing adhesion between the sections of said strip so that when the container is filled said seam can freely extend without presenting an undue obstruction in the chamber.

9. The improvement as claimed in claim 8 wherein said adhesion preventing means is a second strip of nylon film having a first portion thereof adhered to the inner surface of one section of said first-mentioned strip and a second portion opposed to said first portion thereof adhered to the inner surface of another section of said first-mentioned strip.

10. An automotive fuel tank comprising:
A. a rigid supporting structure having a cavity therein; and
B. a flexible fuel container disposed within said cavity and including:
1. means communicating with the chamber to allow the container to be filled;
2. a first generally V-shaped composite strip of flexible material extending substantially around the entire interior periphery of the container and fitting into the crotch-like contour formed by said sheets adjacent said joined outer edges thereof with said first strip including:
a. a first layer having a first section which contacts the inner surface of one said sheets and a second section thereof which contacts the inner surface of the other said sheet; and
b. a second layer of dissimilar material to that of said first layer which is bonded to said first layer and disposed between said first and second sections of said first strip to prevent the adhesion thereof so that when the container is filled the seam is free to extend and thereby increase the capacity of the chamber.

* * * * *